(12) United States Patent  
Szumla

(10) Patent No.: US 6,509,978 B1  
(45) Date of Patent: Jan. 21, 2003

(54) METHOD AND APPARATUS FOR FORMATTING BITMAPPED IMAGE DATA

(75) Inventor: Thomas P. Szumla, Lockport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/512,913

(22) Filed: Feb. 25, 2000

(51) Int. Cl.$^7$ .............................................. G06F 15/00
(52) U.S. Cl. ...................... 358/1.8; 358/1.16; 358/1.17; 358/443; 358/444
(58) Field of Search ......................... 358/1.1, 1.8, 1.11, 358/1.12, 1.13, 1.14, 1.15, 1.16, 1.17, 404, 435, 436, 443–444

(56) References Cited

U.S. PATENT DOCUMENTS

| | | | |
|---|---|---|---|
| 4,562,537 A | 12/1985 | Barnett et al. | 712/221 |
| 4,648,045 A | 3/1987 | Demetrescu | 345/505 |
| 5,237,655 A | 8/1993 | Statt et al. | 345/504 |
| 5,262,875 A | 11/1993 | Mincer et al. | 386/101 |
| 5,276,799 A | * 1/1994 | Rivshin | 358/1.15 |
| 5,689,313 A | 11/1997 | Sotheran | 348/715 |
| 5,740,388 A | 4/1998 | Hunt | 345/723 |

* cited by examiner

Primary Examiner—Mark Wallerson  
(74) Attorney, Agent, or Firm—Norman Rushefsky

(57) ABSTRACT

An apparatus (100) for formatting bitmapped image data for printing. An image data bus section (120) has an image bus interface (122) adapted to be coupled to a computer bus to transmit the image data, a front end memory (124) coupled to the image bus interface (122) to receive the image data in an unformatted form, a back end memory (126) for receiving the image data in a formatted form, and a print interface device (1280 coupled to the back end memory (126) for transmitting print data based on the image data in a formatted form. A processor bus section (140) has an image processor (146) and a processor bus interface (1420 adapted to be coupled to the computer bus to communicate print processing instructions between the print processor (146) and the computer. A gateway (160) couples the print processor (146) to the front end memory (124) and the back end memory (126) whereby the print processor 9146) receives the image data in an unformatted form from the front end memory (124), formats the image data, and transmits the image data in a formatted form to the back end memory (126). The image data signals and the processor instruction signals are separated and transmitted over separate buses and bus interfaces to minimize processor I/O wait states and parasitic capacitance.

14 Claims, 3 Drawing Sheets

METHOD AND APPARATUS FOR FORMATTING BITMAPPED IMAGE DATA

BACKGROUND OF THE INVENTION

The invention relates to image processing and more particularly to a method and apparatus for formatting bitmapped data for a printer, such as an inkjet printer.

It is well known to format bitmapped image data for output by a printer, such as an inkjet printer, that scans one or more printing heads over a print medium such as a sheet of paper. Each head can include plural nozzles, i.e. ink orifices, to allow color printing by printing dots of different colors in proximity to, or on top of, one another. For example, if the "CMYK" model is used, orifices for each of the colors cyan, magenta, yellow and black are used in combination to make various colors. The words "bitmap" and "bitmapped" as used herein refer to a representation, consisting of rows and columns of dots, of a graphics image in computer memory. To display a bitmapped image on a monitor or to print it on a printer, the computer formats the bitmapped data into pixels (for display screens) or ink dots (for printers).

During formatting, the bitmapped image data may be subjected to "pixel swath extraction" in which the pixels (i.e., ink dots) are ordered to be associated with a particular print head. Also, the bitmapped image data may be subjected to "nozzle data rendering" in which inkjet nozzle drop data is created based on gray scale data or color gamut data. Pixel swath extraction and nozzle data rendering is ordinarily accomplished by an image processor which reads the bitmapped image out of a memory and formats the data in a known manner. Additionally, the image processor can accomplish error correction and diagnostics based on instructions from the computer generating the image data.

FIG. 2 illustrates a conventional bitmapped image data formatting apparatus. Ordinarily the apparatus is in the physical form of an expansion card that can fit into a slot defined in a computer to interface with a communications bus of the computer. For example, the apparatus can be of a form factor that fits into a PCI (peripheral component interconnect) slot to interface with a personal computer having a PCI bus. Formatting apparatus 10 includes bus interface 12 which includes hardware and/or software to for interfacing with bus 14 of the computer in a known manner. For example bus interface 12 can be a standard PCI interface. Image processor 16 is coupled to bus interface 12 by local communications bus 13 to obtain bitmapped image data output by the computer and to obtain processing instructions from the computer, such as correction instructions and diagnostics, through bus interface 12. After being formatted by processor 16, the image data is sent to print interface 18 in a known manner. Interface 18 is associated with one or plural print heads or print engines of the printer (not illustrated) and outputs data for the print heads or print engines in an appropriate protocol, such as Centronix serial, USB (universal serial bus), parallel, or the like, depending on the interface of the printer.

Since a single bus interface and a single local communications bus is used to carry both image data and processing instructions, the processor will have many wait states while it waits for image data to be communicated. Further, the architecture in which a plurality of elements (e.g. the bus interface, the processor, and any buffers, accumulators, or other elements (not illustrated) are disposed in a single data path, presents a high capacitance of the system. Both of these factors serve to slow down the effective formatting speed of the conventional apparatus and cause the computer user to wait. Accordingly, it is desirable to speed up formatting of bitmapped image data for printing.

BRIEF SUMMARY OF THE INVENTION

A first aspect of the invention is an apparatus for formatting bitmapped image data for printing, comprising an image data bus section having an image bus interface adapted to be coupled to a computer bus to transmit the image data, a front end memory coupled to the image bus interface to receive the image data in an unformatted form, a back end memory for receiving the image data in a formatted form, and a print device coupled to the back end memory for transmitting print data based on the image data in a formatted form. The apparatus also comprises a processor bus section having an image processor, a processor bus interface adapted to be coupled to the computer bus to communicate print processing instructions between the print processor and the computer, and a gateway coupling the print processor to the front end memory and the back end memory. The print processor receives the image data in an unformatted form from the front end memory, formats the image data, and transmits the image data in a formatted form to the back end memory.

A second aspect of the invention is a method for formatting bitmapped image data comprising the steps of transmitting the image data through an image bus interface coupled to a computer bus to a front end memory coupled to the image bus interface to store the image data in an unformatted form, communicating print processing instructions, through a processor bus interface coupled to the computer bus, to a print processor, reading the image data in the unformatted form out of the front end memory to the print processor through a gateway coupling the print processor to the front end memory, formatting the image data with the print process or, transferring the image data in a formatted form to a back end memory, and reading the image data in a formatted form out of the back end memory to a print interface device.

Accordingly, the invention provides a processor architecture in which the data and processor address signals are separated. Also, the invention provides a bus structure in which I/O wait states of the most utilized operations, such as instruction fetches from memory and stack variable access from memory, are minimized. The invention also provides the image data its own path as much as possible during formatting and provides concurrent operation of the processor and transfer of image data from the computer.

DETAILED DESCRIPTION OF THE INVENTION

Figure 1:
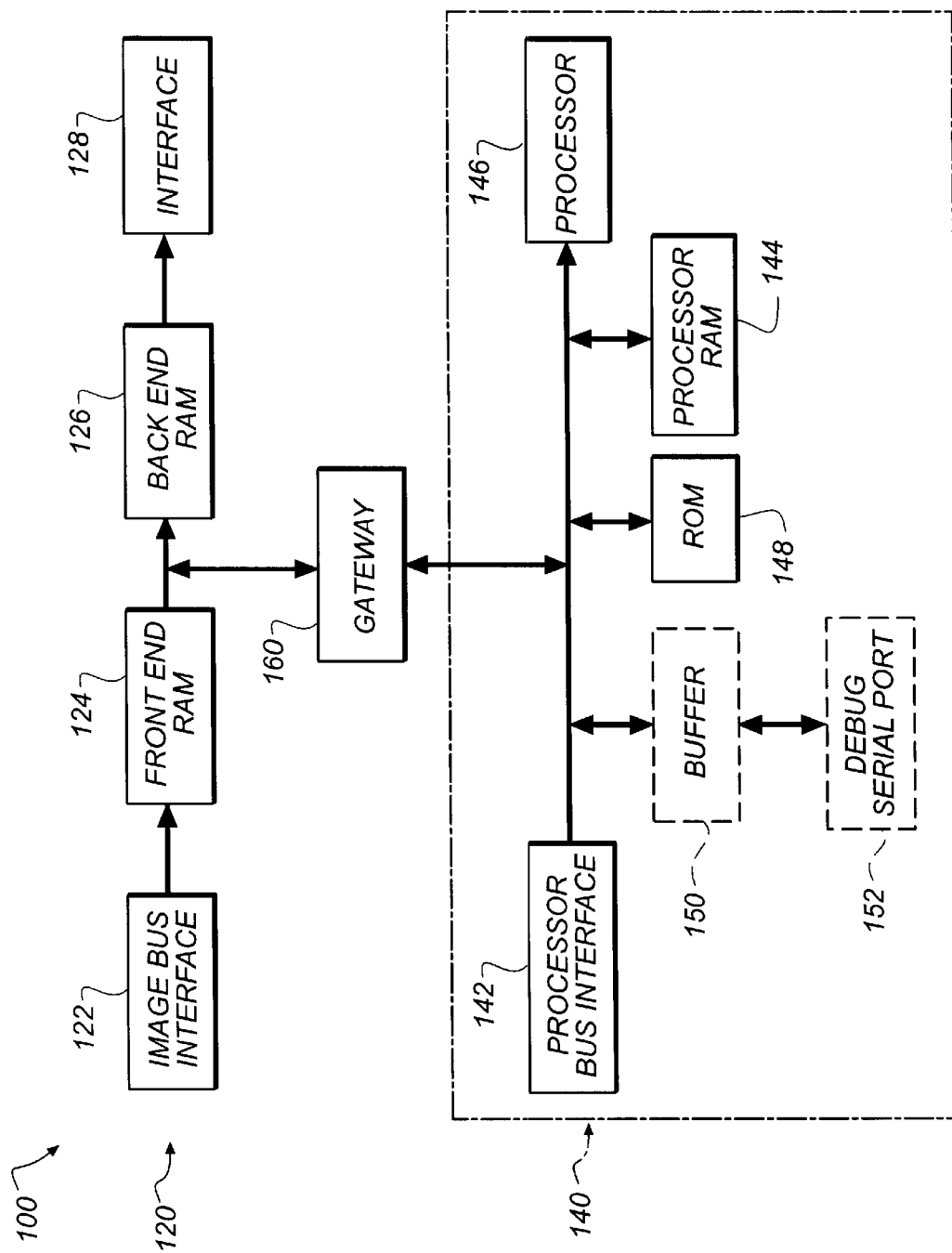
FIG. 1 is a block diagram of a formatting card in accordance with a preferred embodiment of the invention.
Figure 2:
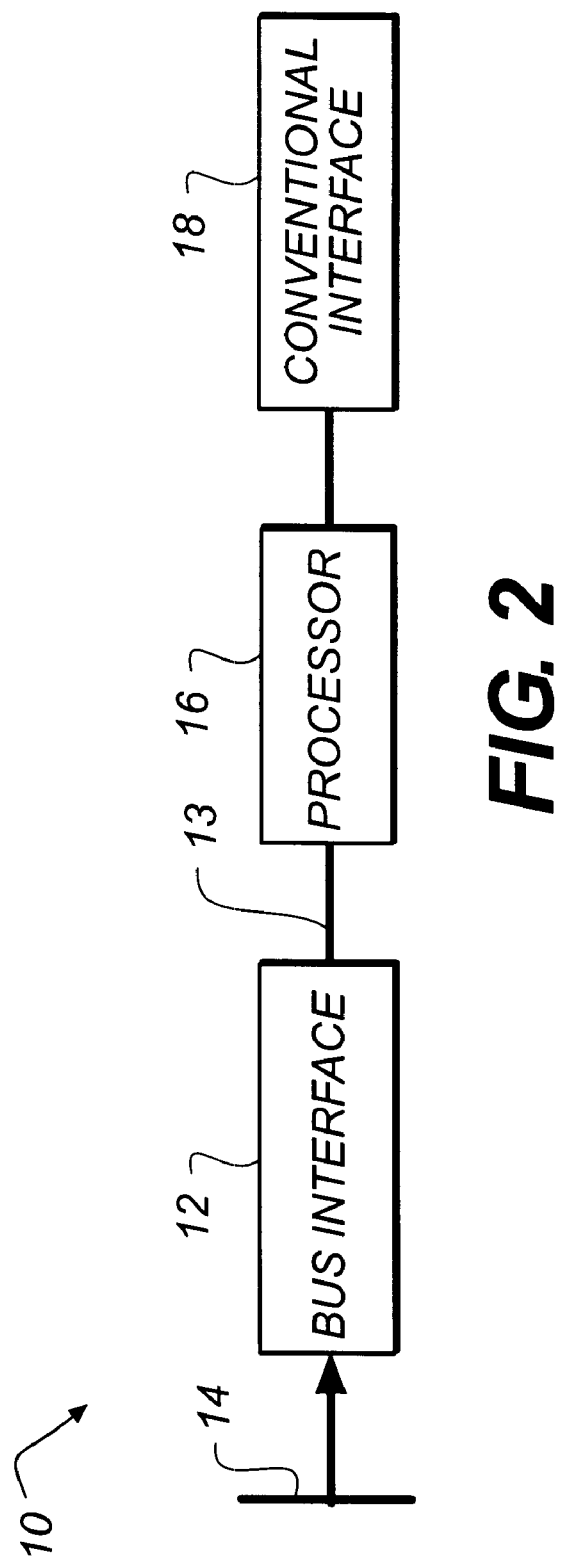
FIG. 2 is a block diagram of a conventional formatting apparatus.

FIG. 1 illustrates a preferred embodiment of the invention. Image data formatting card 100 includes three primary sections. Image data bus section 120 comprises most components through which image data flows as described below. Processor data bus section 140 comprises processing components and a relatively high speed bus. Gateway section 160 facilitates communication between image data bus section 120 and processor data bus section 140 in the manner described below.

Image data bus section 120 comprises image bus interface 122 which interfaces image data bus section 120 to a peripheral bus of the computer (not illustrated). For example, if the computer has a PCI bus, formatting card 100 can be in the form factor of a standard PCI card and image bus interface 122 will be a standard PCI interface. Image data bus section 120 also comprises front end RAM (random access memory) 124, back end RAM 126, and interface 128 associated with one or more print heads or print engines of the printer (not illustrated). Interface 128 outputs data for the print heads or print engines in an appropriate protocol, such as Centronix serial, USB (universal serial bus), parallel, or the like, depending on the input interface of the printer. Front end RAM 124 and back end RAM 126 can each be a dual port SDRAM (synchronous dynamic random access memory) device. This permits data to be transferred into the memories at the same time it is transferred out at a very high speed. However, any appropriate type of memory device can be used as front end RAM 124 and back end RAM 126, such as VRAM, WRAM, RDRAM, SGRAM, DRAM, or any single or multiple port memory device. Communications between elements of image data bus section 120 are accomplished by an image data bus using known hardware and known protocols. For the sake of clarity, the connections between components are merely illustrated in a schematic manner.

Processor data bus section 140 comprises processor bus interface that is similar to, but separate from, image bus interface 122, a PCI interface for example. Processor bus section 140 also comprises processor 146 which receives processing instructions from the computer and transmits processing instructions to the computer. For example, processing instructions can include initialization commands, error information, diagnostic information, bad nozzle data for failed nozzle correction, and other instructions for processing a print job. Processor 146 can be any type of digital image processor, such as a POWER PC™ or INTEL™ i960 processor. Processor data bus section 140 also comprises ROM (read only memory) 148, which contains a print formatting process control program, and SRAM (static random access memory) 144, which serves as a workspace for image data being formatted by processor 146. Alternatively, ROM 148 can be replaced by any type of memory device that can retain the control program, such as a flash memory device, or the like.

Figure 3:
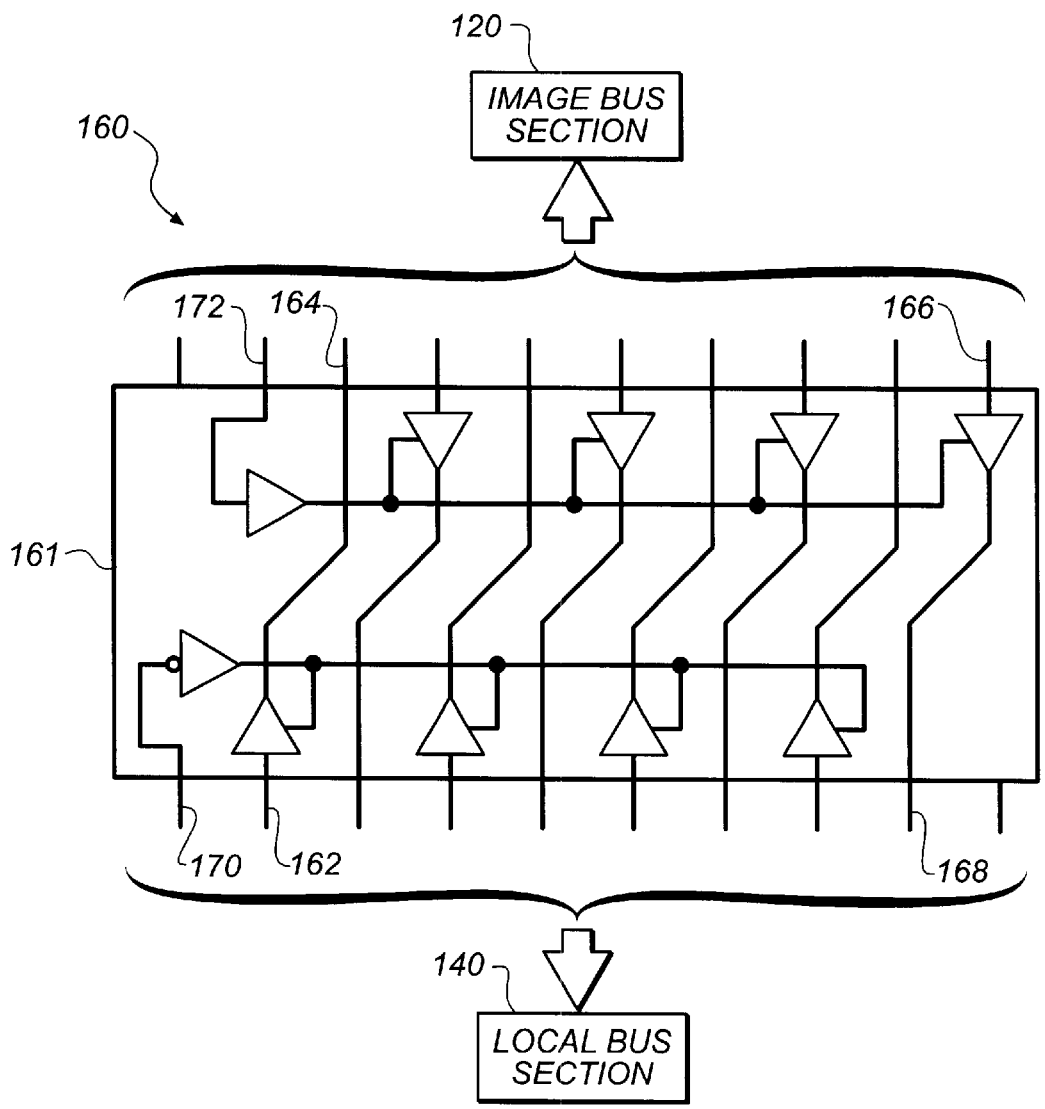
FIG. 3 is a block diagram of the gateway of the preferred embodiment.

FIG. 3 illustrates gateway 160 including transceiver 161. For example transceiver 161 can be an IC 74HCT241 sold by National Semiconductor. Transceiver 161 serves as a buffer (i.e., it isolates image data bus section 120 and processor data bus section 140) and as a repeater (i.e., it receives, amplifies and retransmits signals between image data bus section 120 and processor data bus section 140). In the preferred embodiment, two data paths through transceiver 161 are used. The data path from terminal 166 to terminal 168 is used for data from front end RAM 124 to processor data bus section 140. Similarly, the data path from terminal 162 to terminal 164 is used for data from processor data bus section 140 to back end RAM 126. Of course data flow is controlled by processor 146. In particular, processor 146 is coupled to terminals 170 and 172. Terminal 170 is used to activate that data path from terminals 162 to 164 and terminal 172 is used to activate the data path from 166 to 168.

Transceiver 161 effectively "listens" to data asserted on the image data bus by front end RAM 124 and repeats what it "hears" at input terminal 166 on output terminal 168. The signal is buffered and thus the data path presents a relatively small amount of capacitance. Also, the signal is amplified (repeated) to provide good fidelity. Similarly, transceiver 161 effectively "listens" to data asserted on the processor data bus by processor RAM 144 and repeats what it "hears" at input terminal 162 on output terminal 164 to send data to back end RAM 126. The signal is buffered and thus the data path presents a relatively small amount of capacitance. Also, the signal is amplified (repeated) to provide good fidelity.

Transceiver 161 can be controlled by processor 146 to provide "half duplex" operation. In other words, data can only be sent in one direction (i.e. over one data path) at a time. Front end RAM 124 and back end RAM 126 need not arbitrate which device is asserting data on shared lines because the data moves on one general direction, i.e. out of front end RAM 124, to processor data bus section 140, and then to back end RAM 126. Note that transceiver 161 has additional data paths that are not used in the preferred embodiment. Transceiver 161 can be any device that has data paths that can be enabled and disabled selectively, present a relatively small capacitance to the circuit, and can transmit data with adequate fidelity.

In operation, a print initialization command (indicating that bitmapped data, such as a TIFF file, is to be printed) is generated by the computer and sent to processor bus interface 142 and handshaking occurs between processor 146 and the computer CPU to establish communications. In the meantime, image bus interface 122 is identified by a driver as a special bus write function and can begin to receive image data almost immediately and before the above-noted handshaking is completed. Accordingly, while the handshaking is occurring, the bitmapped image data begins to be loaded into front end ram 124. Preferably front end RAM 124 is sized to be able to hold data files that are likely to be transmitted for printing in their entirety. Therefore, once handshaking is completed and communications are established between processor 146 and the CPU of the computer, or very soon thereafter, processor 146 can begin to format the bitmapped image data.

During an initialization procedure accomplished after the handshaking, instructions from an image processing control program are downloaded from ROM 148 to processor 146 in a known manner. By the time the instructions are downloaded, there may already be enough image data in front end RAM 124 to begin formatting. Otherwise, processor 146 will wait for enough data. Processor 146 then requests a block of image data from front end RAM 124 and reads the block out to processor RAM 144 through gateway 160. RAM 144 serves as a temporary workspace for formatting of the image data by processor 146 in a known manner. For example, the block of image data is subjected to a pixel swath extraction process and to a nozzle data rendering process during formatting. Front end RAM 124 operates in a FIFO (first in, first out) manner and thus reading out of the block of image data to processor RAM 144 permits another block of image data to be loaded into front end RAM 124 if necessary.

Once the block of image data in processor RAM 144 is formatted, the formatted block of image data is read out of processor RAM 144 to back end RAM 126 across gateway 160. The formatted information can be stored in a buffer of back end RAM 126 associated with a particular nozzle head 128 based on the rendered nozzle data. This formatting procedure continues for subsequent blocks of data until all of the image data is formatted. When back end RAM 126 becomes full, or at any other appropriate time, the formatted image data can be read out of back end RAM 126 to interface 128 for generating a signal for the print heads of the printer (not illustrated). Back end RAM 126 can also operate in a FIFO (first in, first out) manner and thus reading out of the block of image data to interface 128 permits another block of image data to be loaded into back end RAM 126 if necessary.

The local bus of processor bus section 140 is a high speed bus to facilitate image data formatting. However, it may be desirable to interface slower devices to the local bus. For example, Serial Port 152 may be used for debugging and other diagnostic purposes. In such a case, buffer 150 can be supplied between serial port 152, or any other slower device, and the local bus. Buffer 150 can be a transceiver similar to gateway 160.

It can be seen that separate buses and bus interfaces are used for most transmission of image data and for processing instructions. Therefore, image data can be transmitted from the computer through the image bus interface while the processor is initializing, receiving instructions, or otherwise communicating with the computer through processor bus interface 142. The most utilized I/O operations, such as instruction fetches from the processor ROM 148 and stack-variable access out processor RAM 144, have minimum wait states. Also, the processor communication bus section has a limited number of components and thus has less parasitic capacitance. Accordingly, the invention formats image data very quickly.

The various components can have any structure that accomplishes the disclosed functions. For example, the various memory devices can be of any appropriate type, such as ROM, RAM, flash memory, or subclasses thereof. The image processor can be of any type and the image processing control program can include any instructions needed to format or otherwise process the image data. The various interfaces can be of any appropriate type depending on the communications bus of the computer and the communications protocol of the printer. Various known hardware form factors and software communication protocols can be used with the invention. The invention can be applied to any type of printer or display.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

PARTS LIST

10 conventional formatting apparatus
12 conventional bus interface
13 communication bus
14 computer bus
16 conventional image processor
18 conventional interface
100 image data formatting card
120 image bus section
122 image bus interface
124 front end RAM
126 back end RAM
128 print interface
140 local bus section
142 processor bus interface
144 processor RAM
146 image processor
148 ROM
150 Buffer
152 debug port
160 gateway

What is claimed is:

1. An apparatus for formatting bitmapped image data, comprising:
    an image data bus section having an image bus interface adapted to be coupled to a computer bus to transmit the image data, a front end memory coupled to said image bus interface to receive the image data in an unformatted form, a back end memory for receiving the image data in a formatted form, and a printer interface device coupled to said back end memory for transmitting print data based on the image data in a formatted form;
    a processor data bus section having an image processor, a processor bus interface adapted to be coupled to the computer bus to communicate print processing instructions between said image processor and the computer; and
    a gateway coupling said image processor to said front end memory and said back end memory whereby said image processor formats the image data as read out of said front end memory, and transmits the image data in a formatted form to the back end memory.

2. An apparatus as recited in claim 1 wherein said image bus interface is identified as a special bus write function.

3. An apparatus as recited in claim 2, wherein handshaking between said image processor and a processor of the computer is accomplished through said processor bus interface.

4. An apparatus as recited in claim 1, further comprising a read only memory containing an image processing control program coupled to said image processor.

5. An apparatus as recited in claim 1, further comprising a random access memory coupled to said image processor and serving as a workspace for formatting by said image processor.

6. An apparatus as recited in claim 1, further comprising:
    an image data bus coupling said image bus interface to said front end memory; and
    a local bus coupling said processor bus interface to said image processor;
    wherein said gateway couples said image data bus and said local bus.

7. An apparatus as recited in claim 1, wherein said printer interface device is adapted to output data to a plurality of print heads.

8. An apparatus as recited in claim 6, further comprising a buffer coupled to said local bus and a low speed communications device coupled to said buffer.

9. A method for formatting bitmapped image data comprising the steps of
    transmitting the image data through an image bus interface coupled to a computer bus to a front end memory coupled to the image bus interface to receive the image data in an unformatted form;
    communicating print processing instructions, through a processor bus interface coupled to the computer bus, to an image processor;
    transferring the image data in the unformatted form from the front end memory to the image processor through a gateway coupling the image processor to the front end memory;

formatting the image data with the image processor;

transferring the data in a formatted form to a back end memory; and reading the image data in a formatted form out of the back end memory; and transmitting the image data read out of the back end memory to a printer interface device.

10. A method as recited in claim 9, further comprising the step of identifying the image bus interface as a special bus write function.

11. A method as recited in claim 10, further comprising the step of accomplishing handshaking between the image processor and a processor of the computer through the processor bus interface.

12. A method as recited in claim 9, further comprising downloading control instructions from a read only memory to the image processor.

13. A method as recited in claim 9, wherein said formatting step comprises using a random access memory coupled to the image processor as a workspace.

14. A method as recited in claim 9, further comprising dividing data into data for a plurality of print heads in said printer interface device.

* * * * *